3,210,419
POLYMERISATION INHIBITING PROCESS IN MAKING METHACRYLIC COMPOUNDS
George McConnell, Widnes, England, assignor to Imperial Chemical Industries Limited, London, England, a corporation of Great Britain
No Drawing. Filed June 16, 1961, Ser. No. 117,501
Claims priority, application Great Britain, June 29, 1960, 22,754/60
2 Claims. (Cl. 260—561)

This invention relates to a polymerisation inhibiting process and more particularly to a process for inhibiting or reducing polymerisation during the manufacture of methacrylic esters.

Methacrylic esters are commonly made from acetone cyanohydrin by a two-stage process in which, in the first stage, the cyanohydrin is reacted with sulphuric acid, oleum or chlorosulphonic acid and in the second stage the resulting product is reacted further with an alcohol. Methacrylamide or a sulphuric acid derivative which can be hydrolysed to methacrylamide is formed in the first stage, which is consequently termed the "amide stage" and the entire reaction mixture of the first stage is usually treated directly in a second stage with an alcohol and a selected proportion of water. Methyl methacrylate in particular is made in this way, using methanol in the second (i.e. esterification) stage.

It is well known that methacrylic compounds polymerise very readily and it has been found that considerable deposits of polymeric material form in the apparatus used for making methyl methacrylate by the process outlined above. These deposits form principally in the apparatus in which the second (esterification) stage of the process is carried out and the sulphuric acid reaction product from the first stage is reacted with methanol and water. In order to keep the apparatus working, these deposits have to be removed by frequent cleaning, which is expensive and troublesome, with consequent loss of productive capacity of the plant.

Some reduction of this undesirable polymer formation can be achieved by addition of known polymerisation inhibitors, for example hydroquinone, to the reaction mixture at the esterification stage, but even so the polymer deposits formed are still considerable and the results are not entirely satisfactory.

It has now been found, surprisingly, that polymer deposition in the second (i.e. esterification) stage can be reduced to a very great extent by carrying out the first stage of the reaction in the presence of certain additives, particularly compounds of the phenothiazine, phenoxazine and phenazine series. It appears from this that the deposition of polymer in the second stage may not be due principally to polymerisation taking place in this second stage, as has previously been thought, but may arise mainly from polymerisation processes which take place in the first (i.e. amide) stage, where however the polymer remains soluble in the reactant system and only appears as a separate phase under the different conditions of the later (i.e. esterification) stage. It has also been found that other conventional stabilisers such as hydroquinone are far less effective even when added to the first stage of the reaction, so that it is even more surprising that the aditives herein defined have this valuable polymerisation inhibiting effect now observed.

The manufacture of methacrylic esters from acetone cyanohydrin is known to involve intermediate formation of other methacrylic compounds, as for example methacrylamide and methacrylic acid by progressive hydrolysis, and a variety of methacrylic compounds can be made from the product of the "amide stage" by the use of different conditions for working up the reaction mixture. In view of this, utility of the stabilising effect in the "amide stage" of the additives herein defined is not necessarily restricted to that case in which the product of the "amide stage" is used for the production of esters, though the process is of especial commercial value for the production of methacrylic esters.

This inhibiting effect on polymer formation which has now been discovered is closely associated with the organic ring structure containing two hetero atoms which occurs in compounds of the phenothiazine, phenoxazine and phenazine series. Replacement of such compounds by diphenylamine carbazole, acridine or dibenzthiophene leads to substantially higher quantities of polymer being produced.

Thus according to the present invention there is provided, in processes for the manufacture of methacrylic compounds from acetone cyanohydrin by treatment thereof with sulphuric acid, oleum or chlorosulphonic acid, the improvement which comprises carrying out the treatment in the presence of a stabiliser consisting of a compound containing in its molecular structure the organic ring system:

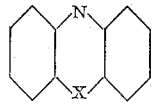

wherein X stands for an atom of sulphur, oxygen or nitrogen.

In particular, the stabilisers for use in the process of the present invention include compounds of the phenothiazine, phenoxazine and phenazine series. Examples of suitable compounds include not only phenothiazine itself, phenoxazine itself and phenazine itself, but also derivatives thereof, for example substituted derivatives and oxides. In general, the substituted derivatives which are most useful are those containing substituents which do not assist oxidation or polymerisation of methacrylic compounds in sulphuric acid media, particularly those of neutral or reducing character for example chloro, alkyl carboxy, hydroxy, amino and alkylamino groups. There may also be used compounds which are quinonoid derivatives in these series, for example the thiazine dyestuff methylene blue (3:7-bis-dimethylamino phenazothionium chloride). Phenothiazine itself is preferred on account of being readily and cheaply available commercially and also being highly effective in the process of the present invention.

An especially valuable form of the present invention is that by which there is provided a process for the manufacture of methacrylic esters from acetone cyanohydrin, wherein the reaction mixture produced by treatment of acetone cyanohydrin with sulphuric acid, oleum or chlorosulphonic acid in the presence of a stabiliser as hereinbefore defined, is reacted further with an alcohol. A wide variety of alcohols may be used, as is already well known in the art, for example aliphatic monohydric alcohols, particularly methanol, ethanol, butanol and the like. The particular conditions which are most appropriate will depend upon the particular ester to be made, but can readily be found by simple trial.

The proportion of the stabiliser compound to be used is usually between 0.001% and 0.2%, and preferably between 0.005% and 0.05%, by weight of the total reaction mixture employed. Alternatively, the proportion may be between 0.003% and 0.6%, preferably between 0.015% and 0.15%, by weight of the acetone cyanohydrin employed. Larger or smaller proportions may also be used if desired, and the optimum proportions may vary to some extent with the particular materials and reaction conditions selected.

The stabiliser compound may be added directly as a powder, suspension or solution to the reaction vessel in which the amide stage is carried out, but is more conveniently added either as a solution in the acetone cyanohydrin or as a solution in acetone which is added to one of the feed streams to the reaction vessel. Alternatively, it can be added to the acetone used for the synthesis of the acetone cyanohydrin. The presence of these added materials does not render the acetone cyanohydrin unstable and the cyanohydrin can, if desired, be subjected to a vacuum stripping treatment; under some conditions part of the stabiliser may be decomposed during the stripping, but sufficient remains to provide stabilisation during the subsequent "amide stage."

The proportions of reactants, the conditions, time of reaction and other details of the process to be used, other than that of adding the stabiliser compound as herein specified, are those well known in the art. If desired known additives can also be added to the reaction mixture. In particular, other known stabilisers which are better suited to the conditions existing in subsequent stages of the process may be added after completion of the "amide stage," because the stabilisers defined above exert their stabilising effect best in the strongly acid medium of the "amide stage." Thus for example hydroquinone may be added at the esterification stage as additional stabiliser for the monomeric methacrylic ester under the esterification conditions. The process may be carried out using a batchwise or a continuous technique, as desired.

The process of the present invention is especially useful for the manufacture of methyl methacrylate, though it may also be used for other methacrylic compounds. By its use, the loss of material due to polymer formation and the wastage of labour and operating time required for cleaning the plant are considerably reduced; the reduction achieved frequently exceeds 90% of that formerly regarded as unavoidable.

The methacrylic ester may be isolated and purified by the usual techniques, principally by distillation, which satisfactorily remove the phenothiazine compound and any decomposition products derived from it.

The invention is illustrated but not limited by the following examples in which the parts and percentages are by weight.

The ring numbering used in these examples conforms to the RRI numbering given in the second edition of "The Ring Index" (A. M. Patterson, L. T. Capell, and D. F. Walker; American Chemical Society Chemical Abstracts Service, 1959).

*Example 1*

510 parts of acetone cyanohydrin, in which is dissolved 0.14 part of phenothiazine, are added with stirring to 886 parts of 100% sulphuric acid over a period of 30 minutes, during which time the temperature of the mixture is not allowed to exceed 95° C. When mixing is complete, the temperature of the mixture is raised during a further period of 30 minutes to 140° C. The crude reaction mixture thus obtained, containing methacrylamide, is then added to a mixture of 384 parts of methanol and 216 parts of water in a second vessel, and the whole is heated under refluxing conditions for 3 hours and finally is steam distilled to produce a crude methyl methacrylate as distillate.

The aqueous residue remaining in the steam distillation vessel contains 0.8 part of polymeric material.

Repetition of the procedure of the above example except that the phenothiazine is omitted, gives an aqueous residue containing 30 parts of polymeric material.

Further repetition of the procedure of the above example (a) with the addition of 1 part of hydroquinone to the contents of the second vessel, also gives an aqueous residue containing 0.8 part of polymeric material;

(b) with the addition of 1 part of hydroquinone to the contents of the second vessel and with the omission of the phenothiazine, gives an aqueous residue containing 8.6 parts of polymeric material;

(c) with the substitution of 0.14 part of hydroquinone for the 0.14 part of phenothiazine and with the addition of 1 part of hydroquinone to the contents of the second vessel, gives an aqueous residue containing 2.6 parts of polymeric material.

*Example 2*

The procedure of Example 1(a) is repeated using 510 parts of acetone cyanohydrin in which is dissolved 0.14 part of methylene blue instead of 0.14 part of the phenothiazine. The amount of polymeric material remaining in the aqueous residue from the steam distillation is 2.0 parts.

*Example 3*

1040 lb./hr. 96% sulphuric acid, 1845 lb./hr. of 17% oleum and 1750 lb./hr. acetone cyanohydrin are fed continuously to a stirred mixing vessel, the temperature of which is maintained between 85 and 95° C. The liquid overflowing from this vessel is passed through a length of heated pipe in which its temperature is raised to 145–155° C., and from which it is passed into an esterification system consisting of three vessels in series. Methanol and steam are continuously fed into the first vessel, to which hydroquinone is also added, and a crude methyl methacrylate is continuously distilled from each vessel into a common receiver. The rate of formation of polymer averages 700 lb./day in all the three vessels constituting the esterification section of the plant. When a 20% solution of phenothiazine in acetone is added to the acetone cyanohydrin feed at a rate equivalent to 0.04% by weight of the acetone cyanohydrin feed, the rate of polymer produced in the esterifiers is reduced to 30 lb./day.

*Example 4*

The procedure of Example 1(a) is repeated using 510 parts of acetone cyanohydrin in which is dissolved 0.14 part of 3-methoxy phenothiazine in place of the phenothiazine. The amount of polymeric material remaining in the aqueous residue from the steam distillation is 0.6 part.

*Example 5*

The procedure of Example 1(a) is repeated except that 0.14 part of 3-chloro-7-nitrophenothiazine is used in place of the phenothiazine. The amount of polymeric material remaining in the aqueous residue from the steam distillation is 0.4 part.

*Example 6*

The procedure of Example 1(a) is repeated except that 0.14 part of 10-carboethoxy phenothiazine is substituted for the phenothiazine. The amount of polymeric material remaining in the aqueous residue from the steam distillation is 0.6 part.

*Example 7*

The procedure of Example 1(a) is repeated except that 0.14 part of 10-acetyl phenothiazine is substituted for the phenothiazine. The amount of polymeric material remaining in the aqueous residue from the steam distillation is 0.9 part.

*Example 8*

The procedure of Example 1(a) is repeated except that 0.14 part of phenothiazine-5-oxide is substituted for the phenothiazine. The amount of polymeric material remaining in the residue from the steam distillation is 0.2 part.

*Example 9*

The procedure of Example 1(a) is repeated except that 0.14 part of 10-ethyl phenothiazine is substituted for the phenothiazine. The aqueous residue from the steam distillation contains 1.5 parts polymeric material.

Example 10

The procedure of Example 1(a) is repeated except that 0.14 part of 7-aniline-9-methyl-3-oxo-1:2:4-trichloro-3-hydrophenothiazine is substituted for the phenothiazine. The aqueous residue from the steam distillation contains 0.8 part polymeric material.

Example 11

344 parts of acetone cyanohydrin in which is dissolved 0.1 part phenothiazine are added with stirring over a period of 30 minutes to 588 parts of sulphuric acid containing 1.5% by weight of excess sulphur trioxide. During this stage the temperature is held at 95° C., but when the addition is complete the system is heated to 140° C. over a period of 30 minutes. The product is then cooled to 100° C., and a mixture of 592 parts normal butanol and 144 parts water containing 1.5 parts hydroquinone is added to the system, which is then refluxed for a period of 4 hours. On cooling the contents of the reactor separate into two phases, butyl methacrylate being recoverable by distillation of the separated organic (lighter) phase. Polymer is not detectable in either the aqueous or organic phases.

When the above procedure is repeated with the omission of the phenothiazine no polymer is again detectable in the organic phase, but 3 parts are recoverable from the aqueous phase.

Example 12

The procedure of Example 1(a) is repeated except that 0.14 part of phenoxazine is substituted for the phenothiazine. The aqueous residue from the steam distillation contains 0.7 part polymeric material.

Example 13

The procedure of Example 1(a) is repeated except that 0.14 part of phenazine is substituted for the phenothiazine. The aqueous residue from the steam distillation contains 0.5 part polymeric material.

What I claim is:

1. In a process for the manufacture of methacrylic compounds from acetone cyanohydrin by reaction of acetone cyanohydrin with an acid reactant selected from the group consisting of sulphuric acid, oleum and chlorosulphonic acid, the improvement which comprises carrying out the reaction in the presence of phenoxazine as a stabilizer compound.

2. In a process for the manufacture of methacrylic compounds from acetone cyanohydrin by reaction of acetone cyanohydrin with an acid reactant selected from the group consisting of sulphuric acid, oleum and chlorosulphonic acid, the improvement which comprises carrying out the reaction in the presence of phenazine as a stabilizer compound.

References Cited by the Examiner

UNITED STATES PATENTS

| | | | |
|---|---|---|---|
| 2,822,348 | 2/58 | Haslam | 260—75 |
| 2,836,615 | 5/58 | Heininger et al. | 260—486 X |
| 2,890,101 | 6/59 | Borrel et al. | 260—486 X |
| 2,916,512 | 12/59 | Fisher et al. | 260—486 |
| 3,009,947 | 11/61 | Baron et al. | 260—486 |
| 3,023,230 | 2/62 | Baron et al. | 260—486 |

LORRAINE A. WEINBERGER, *Primary Examiner.*

TOBIAS E. LEVOW, ABRAHAM H. WINKELSTEIN, LEON ZITVER, *Examiners.*